(12) United States Patent
Vanderwerf (10) Patent No.: US 10,401,170 B2
(45) Date of Patent: Sep. 3, 2019

(54) SYSTEMS AND METHODS FOR PROVIDING AUTOMATIC DETECTION OF INERTIAL SENSOR DEPLOYMENT ENVIRONMENTS

(71) Applicant: Honeywell International Inc., Morristown, NJ (US)

(72) Inventor: Kevin D. Vanderwerf, Oro Valley, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 987 days.

(21) Appl. No.: 14/568,777

(22) Filed: Dec. 12, 2014

(65) Prior Publication Data

US 2016/0169674 A1    Jun. 16, 2016

(51) Int. Cl.
*G01P 5/00* (2006.01)
*G01C 19/34* (2006.01)
(Continued)

(52) U.S. Cl.
CPC .............. *G01C 19/34* (2013.01); *G01C 19/38* (2013.01); *G01C 21/16* (2013.01); *G01C 25/005* (2013.01)

(58) Field of Classification Search
CPC ........ G01C 19/34; G01C 19/38; G01C 21/16; G01C 25/005
(Continued)

(56) References Cited

U.S. PATENT DOCUMENTS 6,577,976 B1 * 6/2003 Hoff ....................... G01C 25/00
324/246
8,607,613 B2  12/2013 Kerbiquet et al.
(Continued)

FOREIGN PATENT DOCUMENTS

WO    2006025825    3/2006

OTHER PUBLICATIONS

European Patent Office, "Communication under Rule 71(3) EPC, EP Application No. 15198121.4, dated Jan. 4, 2016", "from Foreign Counterpart of U.S. Appl. No. 14/568,777", filed Nov. 4, 2016, pp. 1-33, Published in: EP.
(Continued)

*Primary Examiner* — Vu A Le
(74) *Attorney, Agent, or Firm* — Fogg & Powers LLC (57) ABSTRACT

Systems and methods for providing automatic detection of inertial sensor deployment environments are provided. In one embodiment, an environment detection system for a device having an inertial measurement unit that outputs a sequence of angular rate measurements comprises: an algorithm selector; and a plurality of environment detection paths each receiving the sequence of angular rate measurements, and each generating angular oscillation predictions using an environment model optimized for a specific operating environment. The environment model for each of the environment detection paths is optimized for a different operating environment. Each of the environment detection paths outputs a weighting factor that is a function of a probability that its environment model is a true model of a current operating environment given the sequence of angular rate measurements; and wherein the algorithm selector generates an output based on a function of the weighting factor from each of the environment detection paths.

19 Claims, 4 Drawing Sheets

(51) Int. Cl.
G01C 19/38 (2006.01)
G01C 21/16 (2006.01)
G01C 25/00 (2006.01)

(58) Field of Classification Search
USPC ............................. 702/144, 145, 146, 147
See application file for complete search history.

(56) References Cited

U.S. PATENT DOCUMENTS

2009/0048779 A1    2/2009  Zeng et al.
2016/0195398 A1*   7/2016  Ganguli ................ G01C 21/18
                                                            701/3

OTHER PUBLICATIONS

Hide et al., "Multiple Model Kalman Filtering for GPS and Low-cost INS Integration", "Proceedings of the 17th International Technical Meeting of the Satellite Division of The Institute of Navigation", Sep. 21-Sep. 24, 2004, pp. 1096-1103, Published in: Long Beach, CA.

Brown et al., "Introduction to Radom Signals and Applied Kalman Filtering—Third Edition", 1997, pp. 353-361, Publisher: John Wiley & Sons, Inc.

Hide, "Integration of GPS and Low Cost INS Measurements", Sep. 2003, pp. 1-272, Publisher: University of Nottingham.

Hide et al., "Multiple Model Kalman Filtering for GPS and Low-cost INS Integration (Abstract)", "Proceedings of the 17th International Technical Meeting of the Satellite Division of the Institute of Navigation", Sep. 21-Sep. 24, 2004, pp. 1096-1103, Published in: Long Beach, CA.

Weed et al., "GPS Align in Motion of Civilian Strapdown INS", 2004, pp. 1-9, Publisher: Honeywell International Inc.

European Patent Office, "Extended European Search Report for EP Application No. 15198121.4", "from Foreign Counterpart to U.S. Appl. No. 14/568,777", filed Apr. 20, 2016, pp. 1-4, Published in: EP.

Hodson, "Optimal Levelling and Gyrocompassing of Inertial Systems", "IEEE Transactions on Aerospace and Navigational Electronics", Mar. 1, 1963, pp. 18-26, Publisher: IEEE.

* cited by examiner

SYSTEMS AND METHODS FOR PROVIDING AUTOMATIC DETECTION OF INERTIAL SENSOR DEPLOYMENT ENVIRONMENTS

BACKGROUND

In order to ensure proper operation, the typical gyro-compassing device requires an initial alignment to a horizontal reference plane, often referred to as leveling. Performing this alignment on a gyro-compassing device is mostly straight-forward when the leveling is performed on a device that is positioned on the ground or otherwise mounted to a stable platform. However, it is often necessary to perform leveling under less ideal conditions, such as when the device is located on an airborne vehicle or on a ship at sea. To accommodate leveling of a gyro-compassing device in such conditions, different leveling algorithms have been developed. For instance, a gyro-compassing device may incorporate a first leveling algorithm to use when the device is located on the ground, a second leveling algorithm to use when the device is located on an airborne aircraft, and a third leveling algorithm to use when the device is located on a ship at sea. The problem is that gyro-compassing device in the art today must be manually configured as to which leveling algorithm to use prior to initiating its alignment process. That is, the device must be told what type of environment it is being deployed in, so that it may perform the alignment process using the appropriate leveling algorithm. If an incorrect environment and algorithm is selected, use of a leveling algorithm not optimized for the current environment can cause the device to take a longer amount of time to align, and ultimately delay deployment of the system for which the gyro-compassing device is being used.

For the reasons stated above and for other reasons stated below which will become apparent to those skilled in the art upon reading and understanding the specification, there is a need in the art for alternate systems and methods for providing automatic detection of inertial sensor deployment environments.

SUMMARY

The Embodiments of the present invention provide methods and systems for providing automatic detection of inertial sensor deployment environments and will be understood by reading and studying the following specification.

Systems and methods for providing automatic detection of inertial sensor deployment environments are provided. In one embodiment, an environment detection system for a device having an inertial measurement unit that outputs a sequence of angular rate measurements comprises: an algorithm selector; and a plurality of environment detection paths each receiving the sequence of angular rate measurements, and each generating angular oscillation predictions using an environment model optimized for a specific operating environment, wherein the environment model for each of the plurality of environment detection paths is optimized for a different operating environment; wherein each of the plurality of environment detection paths outputs a weighting factor that is a function of a probability that its environment model is a true model of a current operating environment given the sequence of angular rate measurements; and wherein the algorithm selector generates an output based on a function of the weighting factor from each of the environment detection paths.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure enable a gyro compassing device, or other inertial sensing device, to determine for itself the environment in which it has been deployed so that it may self-select the appropriate leveling algorithm from its memory that is optimized for the detected environment. Embodiments of the present disclosure take advantage of empirically gained knowledge regarding the nature of inertial disturbances typically experienced under different environmental conditions. More specifically, embodiments of the present disclosure implement multiple simultaneously running models that each mimics oscillations associated with different environmental conditions. For example, in one embodiment, an environment detection system implements a set of three distinct environment models. In this example, a first model mimics oscillations expected for a fairly high sea state, a second model mimics oscillations expected for an airborne aircraft, and a third model mimics oscillations expected for an on-ground deployment. The mimicked oscillations may be associated with either pitch or roll attitude oscillations. Each of the environment models is implemented within its own distinct propagator-estimator algorithm (which may be implemented, for example, using a Kalman filter algorithm or some variant thereof) which is optimized for a specific environment using one of the environment models. Inertial rate measurements (for example roll rate measurements taken at a frequency of 50 Hz) are captured from the measurement rate output of the gyro compassing device and provided as measurement data to the propagator-estimator. Each propagator-estimator uses its specific environment model to predict the inertial rate measurements it expects from the measurement rate output. The propagator-estimator compares its predicted measurement states with the actual inertial rate measurements, and from any unexpected error between the two, the propagator-estimator computes a rate residual. The propagator-estimator propagates forward a set of updated predicted measurement states calculated from its current predictions and the measurement data. By analyzing the angular rate estimates produced from each propagator-estimator through a weighted probability algorithm, the probability that the results from one of the propagator-estimator is correct will converge on towards a relatively high probability value. The probability that the results from the other propagator-estimators is correct will converge to a low (or zero) probability. The high probability results indicate that the environment model being used by that propagator-estimator best mimics the current operating environment of the gyro compassing device. For example, if the gyro compassing unit is deployed at sea, then the propagator-estimator implementing the "at sea" optimized environment model should produce results that indicate a high probability that the "at sea" model is a "true model" of the current operating environment. This is because the propagator-estimator using the "at sea" model should produce more accurate predictions of expected "at sea" oscillations than the other propagator-estimators. Likewise, if the gyro compassing unit is deployed aboard an in-flight aircraft, then the propagator-estimator implementing the "airborne" optimized environment model should produce rate residuals indicating a high probability that the "airborne" model is producing more accurate predictions of expected oscillations than the other propagator-estimators. Once a determination is made as to which environment model is the true model (meaning that it best mimics the current actual environment oscillations), then the gyro-compassing device can execute the leveling algorithm optimized for that environment. Although embodiments discussing gyro-compassing devices are discussed prominently in this disclosure, it should be noted that embodiments of the present disclosure are not limited to only gyro-compassing devices. Other embodiments expressly include other inertial sensing devices, such as, but not limited to, attitude and heading reference systems (AHRS) or other inertial based navigation systems.

Figure 1:
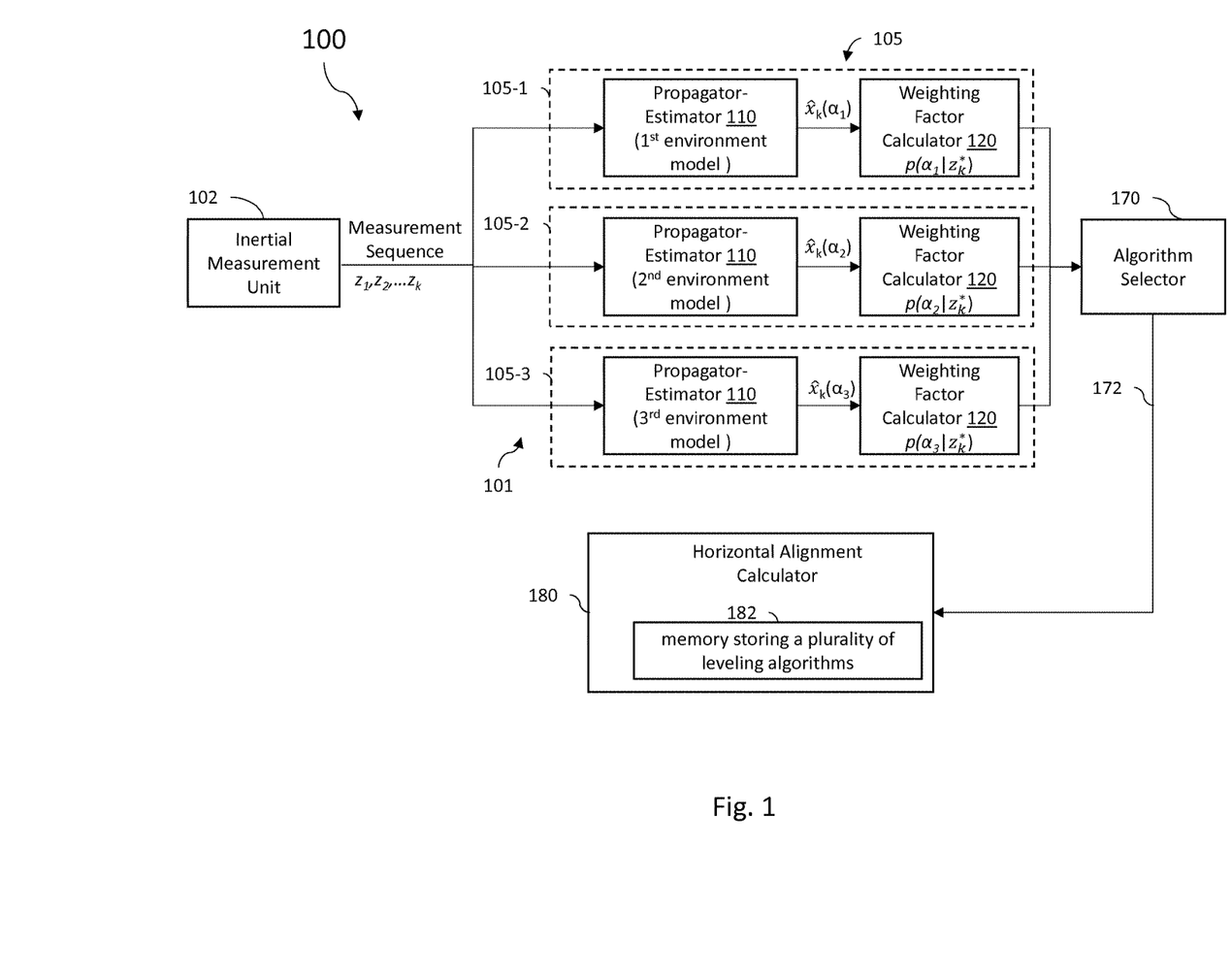
FIG. 1 is a diagram illustrating an environment detection system for an inertial device of one embodiment of the present disclosure.

FIG. 1 is a block diagram illustrating at an environment detection system 101 of one embodiment of the present disclosure for an inertial sensing device 100. Environment detection system 101 includes a plurality of environment detection paths 105 (shown individually by 105-1, 105-2 and 105-3), one path 105 for each potential environment that system 101 is configured to detect. Each of the environment detection paths 105 comprises a propagator-estimator 110 coupled to a weighting factor calculator 120.

In the particular embodiment shown in FIG. 1, environment detection path 105-1 comprises a first propagator-estimator 110 which implements a first environment model optimized to mimic expected at sea attitude oscillations. Environment detection path 105-2 comprises a second propagator-estimator 110 which implements a second environment model optimized to mimic expected airborne attitude oscillations. Environment detection path 105-3 comprises a third propagator-estimator 110 which implements a third environment model optimized to mimic expected on ground attitude oscillations. In still other embodiments, environment detection system 101 may be implemented having only two such environment detection paths, or more than the three shown in FIG. 1.

As mentioned above, in alternate embodiments, each of the propagator-estimators 110 may be implemented using a Kalman filter algorithm (or a variant thereof) which is optimized for a specific environment using an environment model. The propagator-estimator 110 implements state predictor and state update algorithms. That is, using a particular environment model optimized for an environment assigned to a particular environment detection path 105, the propagator-estimator algorithm 110 predicts values for a future set of states based on the present values of the states and the current sequence $z_1, z_2, \ldots, z_k$ of angular rate measurements obtained from the measurement rate output of the inertial measurement unit 102. Each propagator-estimator algorithm 110 then updates its own filter states and compares its predictions to actual inertial rate measurements. This comparison takes into consideration any errors that can be normally expected in the measurement data due to noise, equipment tolerances and variances in environmental conditions. Differences between the measurements and the predictions represent a deviation referred to as a residual error. If the residual is small, the propagator-estimator 110 may attempt to correct for the error by applying the residual error (or at least some fraction of it) into its next iteration of predicted states. If the source of that initial residual error is consistent, then future residual errors calculated from subsequent iterations of predicted values should be smaller than the initial residual error. However, if there is a systemic problem with the environment model (which would be the case where the environment model does not accurately mimic the true current operating environment) large residuals will continue to occur and exceed any expected deviations that otherwise could be attributed to noise in the data.

Figure 2:
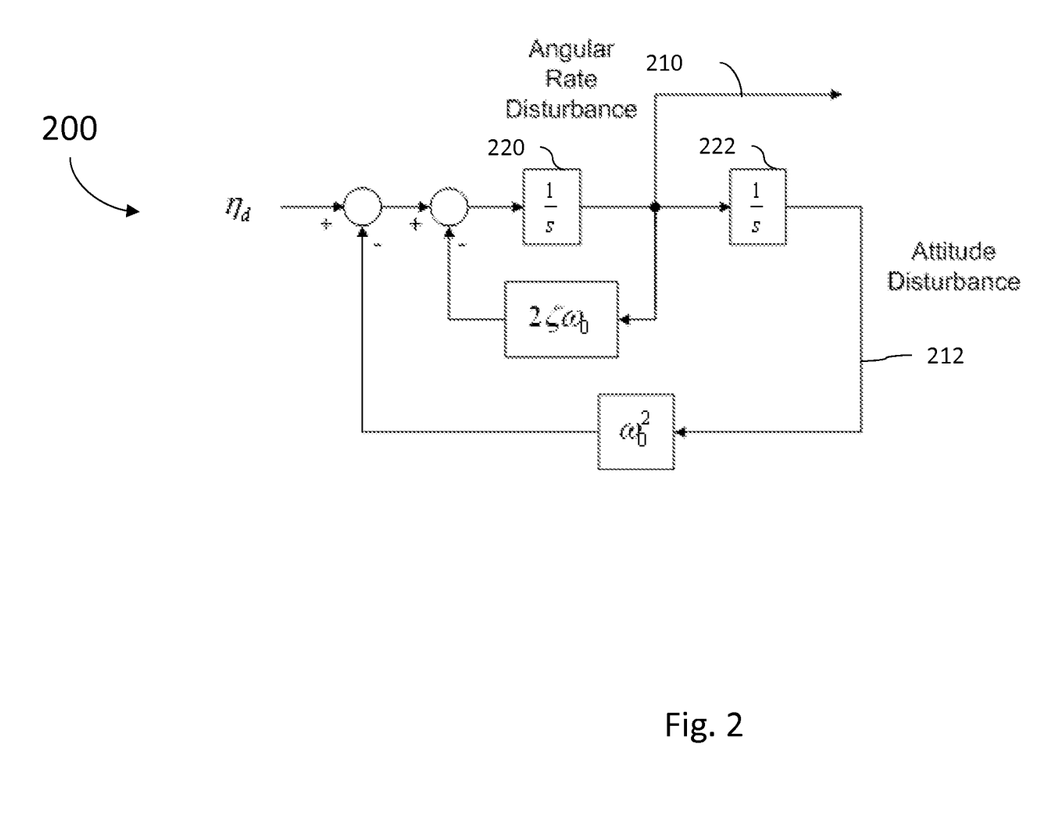
FIG. 2 is a diagram illustrating an environment model for an environment detection system of one embodiment of the present disclosure.

FIG. 2 is a system diagram illustrating an environment model 200 of one embodiment of the present disclosure. More specifically, environment model 200 provide a model of angular rate disturbances which may be expected to affect the inertial rate measurements produced by the inertial measurement sensor under different operating environment. In the particular embodiment shown in FIG. 2, the environment model 200 comprises a $2^{nd}$ order Gauss-Markov model. However, in different implementations, other models may be used, including Gauss-Markov models of a first order or higher, or any stochastic model appropriate for an environment. Environment model 200 is driven by an input of white noise (shown as $\eta_d$) and essentially operates as a second order low pass filter having a dampening ratio of $\xi$ and a natural frequency of $\omega_0$. The resulting modeled angular rate disturbance 210 is a signal having sinusoidal oscillations that are randomly changing in phase and amplitude in a way that mimics expected environmental induced oscillations. When the dampening ratio ($\xi$) is small, the modeled angular rate disturbance 210 will resemble a sine wave. As the dampening ratio ($\xi$) approaches 1, the resulting modeled angular rate disturbance 210 will be more random in nature. In one embodiment, the propagator-estimator algorithm 110 implementing environment model 200 comprises at least two states, one state corresponding to the output of each of the integrators 220 and 222. The output of the first integrator 220 is the modeled angular rate disturbance 210 (in degrees/sec) that will be compared against the inertial rate measurements obtained from the measurement rate output of the inertial measurement system 102. The output of the second integrator 222 represents the attitude disturbance 212 (in degrees). Table 1 provides examples of parameters which may be used to optimize environment model 200 for specific environments.

TABLE 1

|  | On Ground | Airborne | At Sea |
|---|---|---|---|
| Natural Period | 0.455 sec (2.2 Hz) | 3.33 second (0.3 Hz) | 8 second (0.125 Hz) |
| Damping Ratio | 0.15 | 0.7 | 0.1 |
| Attitude Angle Sigma | 0.0051 deg | 0.5 degrees | 3.0 degrees |
| Rate Measurement Noise | 0.07 deg/sec | 0.60 deg/sec | 0.07 deg/sec |

Returning to FIG. 1, the sequence $z_1, z_2, \ldots, z_k$ is a sequence of angular rate measurements obtained from the measurement rate output of the inertial measurement system 102 and applied to each of the environment detection paths 105 of environment detection system 101. Within each of the environment detection paths 105, the propagator-estimator algorithm 110 is determining its best estimate of what the true angular rate is. That is, the output $\hat{x}_k$ from each propagator-estimator algorithm 110 comprises that detection path 105's best estimate of what the true angular rate is given that the environment model 200 used by that path 105 is the true model of the current operating environment. The output values $\hat{x}_k$ are then fed into the weighting factor calculator 120 which calculates the probability that the environment model 200 used by that path 105 is correct given the sequence $z_1, z_2, \ldots, z_k$ of angular rate measurements. That is, each weighting factor calculator 120 calculates a weighting factor $w_i$, for step k that is equal to the probability of its environment model 200 being the correct model ($a_i$) given the particular measurement sequence $z_1, z_2, \ldots, z_k$. This can be expressed as:

$$w_i = p(\alpha_i | z_k^*) \equiv p(\alpha_i | z_k, z_{k-1}, \ldots, z_1)$$

Assuming $p(\alpha_i)=1/3$ (that is, given no advanced information, that each of the three possible true environments are equally probable), this can be determined using Bayes' rule $$p(\alpha_i | z_k^*) = \frac{p(z_k^* | \alpha_i) p(\alpha_i)}{p(z_k^*)} = \frac{p(z_k^* | \alpha_i) p(\alpha_i)}{\Sigma_1^3 p(z_k^* | \alpha_i) p(\alpha_i)}$$

The probability of obtaining the exact measurement sequence, given model i is the correct model, is $$p(z_k^* | \alpha_i) = p((z_k | z^*_{k-1}) | \alpha_i) p(z^*_{k-1} | \alpha_1)$$

Since the probability of getting any exact measurement is actually zero, we instead consider the probability of getting a measurement within a certain interval of the actual measurement $$p((z_k | z^*_{k-1}) | \alpha_i) = \frac{1}{\sqrt{2\pi} \sigma_{res}} \int_{-\delta z/2}^{\delta z/2} e^{-(z_k - H_k x_k^-)/(2\sigma_{res}^2)}$$

where $$\sigma_{res} = \sqrt{H_k P_k H_k^T + R_k}$$

where, H is the measurement matrix, P is the error covariance matrix, and R is the measurement noise covariance as commonly define for Kalman Filters, and where the term δz refers to a probability interval for each measurement (for example, where δz=0.001 deg/sec=0.17×10⁻⁴ rad/sec).

Since each measurement probability is relatively small, the combined sequence probability for each filter quickly approaches zero and we end up with a divide by zero condition. Since we are only concerned with the relative probabilities (i.e. relative to the other filters), we can normalize the probabilities at each step such that the unconditional probability is 1.0. The weights remain the same, but the numerical error is avoided.

$$p(z_k^* | \alpha_i) \Longleftarrow \frac{p(z_k^* | \alpha_i)}{p(z_k^*)}, i = 1, 2, 3$$

$$p(z_k^*) \Longleftarrow 1.0$$

Figure 3:
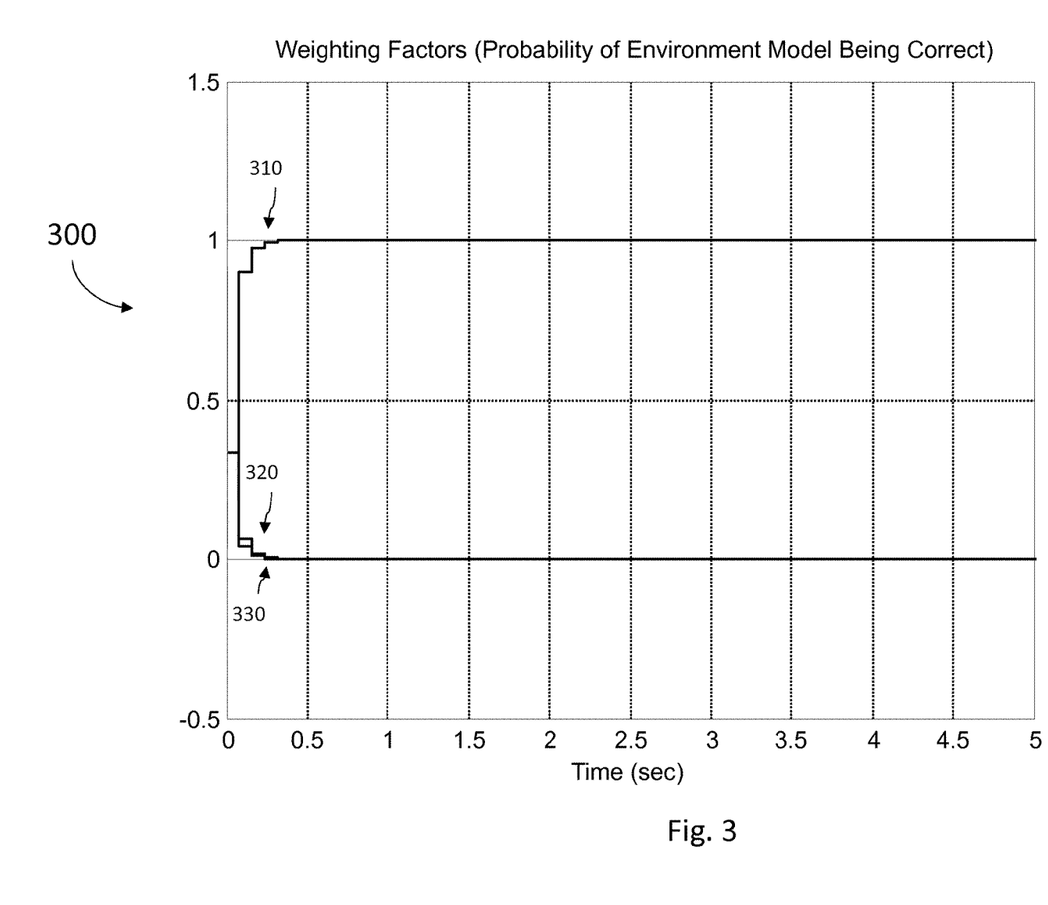
FIG. 3 is a graph illustrating the detection of an operating environment based on an environment detection system of one embodiment of the present disclosure.

Because of the normalization, the probability interval can be reduced significantly and the required probability for detection can be made much closer to 1.0. These change greatly reduce the probability of the incorrect condition being detected. In this way, at each propagation step we can compute the weighting factors for each the environment detection paths 105. As explained above, the environment detection paths 105 which includes the environment model closest to mimicking the true operating environment will produce weighting factors $w_i$ that converge towards one while the incorrect models will produce results that converge toward the probability of zero. This dynamic is illustrated by the graph 300 in FIG. 3. In this figure, the weighting factor for a first of the environment detection paths (shown at 310) converges after a few iterations of its propagator-estimator to a normalized probability of 1 while the weighting factor for a second environment detection path (shown at 320) and a third environment detection path (shown at 330) converge to a normalized probability of zero within about the same number of propagator-estimator iterations.

In one embodiment, the weighting factors $w_i$ from each of the plurality environment detection paths 105 are fed into algorithm selector 170. The alignment algorithm selector 170 determines when the weighting factors $w_i$ indicate that the environment detection system 101 has detected an environment and then generates a detected environment output 172. As shown in FIG. 1, a gyro-compassing device may further comprise a horizontal alignment calculator 180 which includes a memory 182 storing a plurality of leveling algorithms. Each of those leveling algorithms is optimized for calculating the horizontal alignment of the gyro-compassing device under specific operating environments (such as a leveling algorithm for on-ground leveling, a leveling algorithm for airborne leveling, and a leveling algorithm for at-sea leveling, for example).

Based on the value of the detected environment output 172, the gyro-compassing device's horizontal alignment calculator 180 selects from memory 182 and executes the leveling algorithm optimized for that environment. For example, in one embodiment the alignment algorithm selector 170 is deemed to have detected an environment when the weighting factor for a first environment detection path 105 goes above an upper threshold (say $w_i > 1-1.0 \times 10^{-9}$) while the weighting factor for the other environment detection paths goes to less than a lower threshold (say $w_{j \neq i} < 1.0 \times 10^{-9}$). The alignment algorithm selector 170 then generates a detected environment output 172 directing the horizontal alignment calculator 180 to execute the leveling algorithm from memory 182 corresponding to environment for which the environment model 110 of the first environment detection path 105 was optimized.

Figure 4:
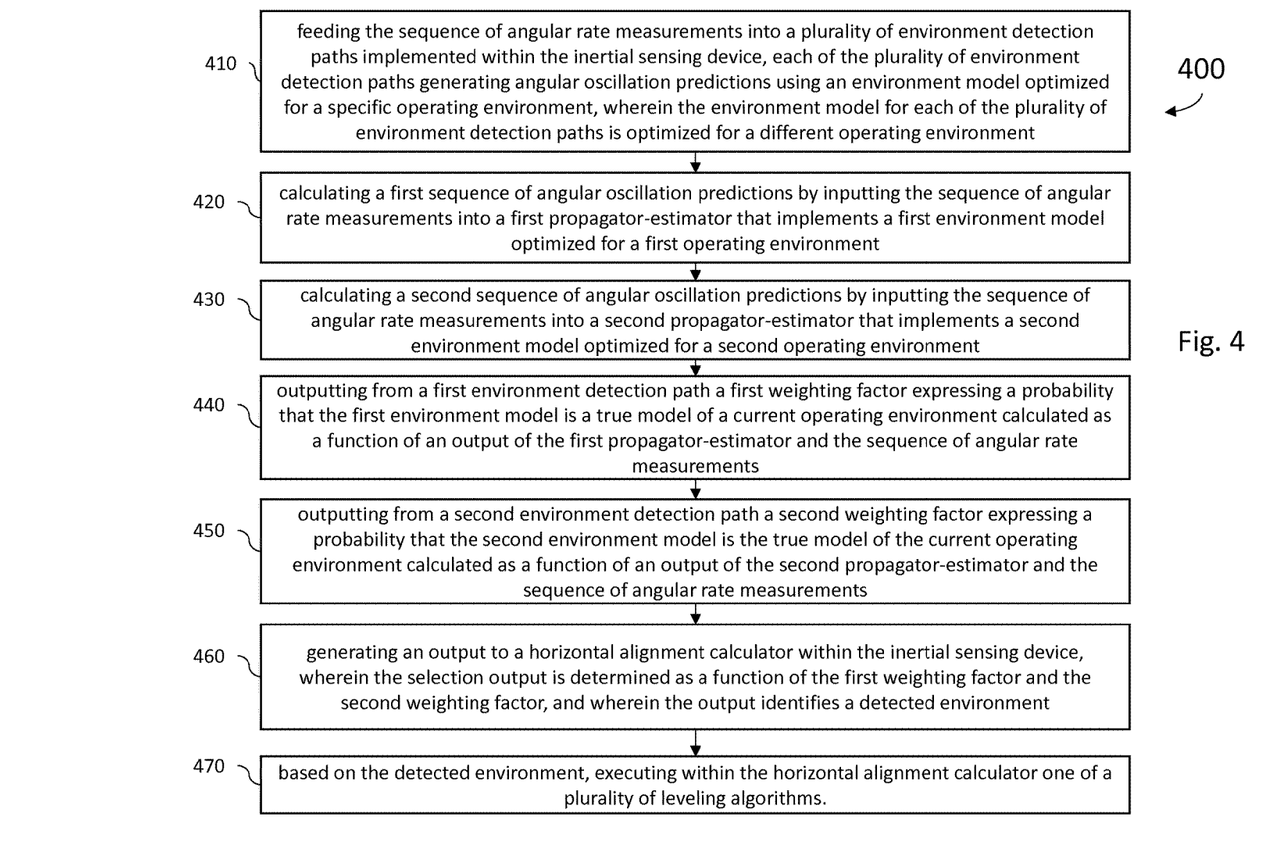
FIG. 4 is a flow chart illustrating a method of one embodiment of the present disclosure.

FIG. 4 is a flow chart illustrating a method 400 of one embodiment of the present invention. For some embodiments, the method of FIG. 4 may be implemented using any embodiment of the environment detection system or elements thereof described above. Accordingly, options and alternatives described with respect to the method of FIG. 4 may be interchanged in any combination with elements of the apparatus embodiments described herein. More specifically, FIG. 4 is drawn to a method for detecting an operating environment an inertial sensing device (such as a gyro-compassing device) having an inertial measurement unit that outputs a sequence of angular rate measurements. Method 400 begins at 410 with feeding the sequence of angular rate measurements into a plurality of environment detection paths implemented within the inertial sensing device, each of the plurality of environment detection paths generating angular oscillation predictions using an environment model optimized for a specific operating environment, wherein the environment model for each of the plurality of environment detection paths is optimized for a different operating environment. That is, each of the environment models is implemented within its own distinct propagator-estimator algorithm which is optimized for a specific environment using one of the environment models. Inertial rate measurements are captured from the measurement rate output of the gyro compassing device and provided as measurement data to the propagator-estimator. Each propagator-estimator uses its specific environment model to predict the inertial rate measurements it expects from the measurement rate output. The propagator-estimators may be implemented using a Kalman filter algorithm (or some variant thereof) which is optimized for a specific environment using one of the environment models. The environment models may comprises a Gauss-Markov model of at least a first order (such as the $2^{nd}$ order model illustrated in FIG. 2, or any other stochastic model appropriate for an environment.

Accordingly, the method proceeds to 420 with calculating a first sequence of angular oscillation predictions by inputting the sequence of angular rate measurements into a first propagator-estimator that implements a first environment model optimized for a first operating environment, and to 430 with calculating a second sequence of angular oscillation predictions by inputting the sequence of angular rate measurements into a second propagator-estimator that implements a second environment model optimized for a second operating environment. As discussed, the plurality of environment detection paths operate in a parallel fashion to each other such that the calculations at 420 and 430 are performed simultaneously, or at least approximately so. The method proceeds to 440 with outputting from a first environment detection path a first weighting factor expressing a probability that the first environment model is a true model of a current operating environment calculated as a function of an output of the first propagator-estimator and the sequence of angular rate measurements, and to 450 with outputting from a second environment detection path a second weighting factor expressing a probability that the second environment model is the true model of the current operating environment calculated as a function of an output of the second propagator-estimator and the sequence of angular rate measurements. In one embodiment, output values $\hat{x}_k$ from each propagator-estimator are then fed into a weighting factor calculator which calculates the probability that the environment model used by that path is correct given the sequence of angular rate measurements. That is, each weighting factor expresses the probability that the environment model implemented within its environment detection path is the correct "true" model of the present operating conditions given the particular measurement sequence from the inertial measurement unit.

The method proceeds to 460 with generating an output to a horizontal alignment calculator within the inertial sensing device, wherein the selection output is determined as a function of the first weighting factor and the second weighting factor, and wherein the output identifies a detected environment. The method proceeds to 470, where, based on the detected environment the method executes, within the horizontal alignment calculator one of a plurality of leveling algorithms is executed. In one embodiment, the method determines when the weighting factors indicate that an environment has been detected and then generates a detected environment output. Based on the value of the detected environment output, the gyro-compassing device executes the leveling algorithm optimized for that environment. For example, in one embodiment an environment is deemed to have been detected when the weighting factor for a first environment detection path goes above an upper threshold (say $w_i > 1-1.0 \times 10^{-9}$) while the weighting factor for the other environment detection paths go to less than a lower threshold (say $w_{j \neq i} < 1.0 \times 10^{-9}$). In one embodiment, the horizontal alignment comprises a memory storing a plurality of leveling algorithms and selects and executes one of the plurality of leveling algorithms based on the output generated at block 460.

EXAMPLE EMBODIMENTS

Example 1 includes an inertial sensing device, the device comprising: an inertial measurement unit, wherein the inertial measurement unit outputs a sequence of angular rate measurements; and an environment detection system, the environment detection system comprising; an algorithm selector; and a plurality of environment detection paths each receiving the sequence of angular rate measurements from the inertial measurement unit, each of the environment detection paths simultaneously executing an environmental model, a propagator-estimator, and a weighting factor calculator; wherein a first environment detection path of the plurality of environment detection paths comprises a first environment model that mimics environmental oscillations associated with a first environment, a first propagator-estimator that calculates a first estimate of a true angular rate given that the first environment model is a true model of a current operating environment, and a first weighting factor calculator that calculates a first weighting factor expressing a probability that the first environment model is the true model of a current operating environment given the sequence of angular rate measurements; wherein a second environment detection path of the plurality of environment detection paths comprises a second environment model that mimics environmental oscillations associated with a second environment different from the first environment, a second propagator-estimator that calculates a second estimate of a true angular rate given that the second environment model is the true model of the current operating environment, and a second weighting factor calculator that calculates a second weighting factor expressing a probability that the second environment model is the true model of the current operating environment given the sequence of angular rate measurements; wherein the algorithm selector generates an output based on a function of the first weighting factor and the second weighting factor.

Example 2 includes the device of example 1, further comprising a horizontal alignment calculator coupled to the inertial measurement unit, wherein the horizontal alignment calculator comprises a memory storing a plurality of leveling algorithms; wherein the horizontal alignment calculator selects and executes one of the plurality of leveling algorithms based on the output from the algorithm selector.

Example 3 includes the device of any of examples 1-2, the plurality of environment detection paths further comprising a third environment detection path that mimics environmental oscillations associated with a third environment different from the first environment and the second environment, a third propagator-estimator that calculates a third estimate of the true angular rate given that the third environment model is the true model of the current operating environment, and a third weighting factor calculator that calculates a third weighting factor expressing a probability that the third environment model is the true model of the current operating environment given the sequence of angular rate measurements; and wherein the algorithm selector generates the output based on a function of the first weighting factor, the second weighting factor and the third weighting factor.

Example 4 includes the device of any of examples 1-3, wherein the propagator-estimator for each of the plurality of environment detection paths is implemented using a Kalman filter.

Example 5 includes the device of any of examples 1-4, wherein the algorithm selector generates an output indicating that the first environment model is the true model of the current operating environment when the first weighting factor exceeds a first probability threshold and the second weighting factor is less than a second probability threshold, where the first probability threshold is greater than the second probability threshold.

Example 6 includes the device of any of examples 1-5, wherein the environment model for each of the plurality of the environment detection paths is optimized to mimic environmental oscillations for one of an on-the-ground environment, an airborne environment, or an at-sea environment.

Example 7 includes the device of any of examples 1-6, wherein the environment model for each of the plurality of the environment detection paths is implemented using a Gauss-Markov model.

Example 8 includes the device of any of examples 1-7, wherein the first weighting factors and the second weighting factor are normalized for each prediction iteration performed by the first propagator-estimator algorithm and the second propagator-estimator algorithm.

Example 9 includes an environment detection system for a device having an inertial measurement unit that outputs a sequence of angular rate measurements, the system comprising: an algorithm selector; and a plurality of environment detection paths each receiving the sequence of angular rate measurements, and each generating angular oscillation predictions using an environment model optimized for a specific operating environment, wherein the environment model for each of the plurality of environment detection paths is optimized for a different operating environment; wherein each of the plurality of environment detection paths outputs a weighting factor that is a function of a probability that its environment model is a true model of a current operating environment given the sequence of angular rate measurements; and wherein the algorithm selector generates an output based on a function of the weighting factor from each of the environment detection paths.

Example 10 includes the system of example 9, the plurality of environment detection paths further comprising: a first environment detection path of the plurality of environment detection paths including a first environment model that mimics environmental oscillations associated with a first environment, a first propagator-estimator that calculates a first estimate of a true angular rate given that the first environment model is a true model of a current operating environment, and a first weighting factor calculator that calculates a first weighting factor expressing a probability that the first environment model is the true model of a current operating environment given the sequence of angular rate measurements; a second environment detection path of the plurality of environment detection paths including a second environment model that mimics environmental oscillations associated with a second environment different from the first environment, a second propagator-estimator that calculates a second estimate of a true angular rate given that the second environment model is the true model of the current operating environment, and a second weighting factor calculator that calculates a second weighting factor expressing a probability that the second environment model is the true model of the current operating environment given the sequence of angular rate measurements; wherein the algorithm selector generates the output based on a function of the first weighting factor and the second weighting factor.

Example 11 includes the system of example 10, wherein the first propagator-estimator comprises a Kalman filter that predicts states of the first environment model; and wherein the second propagator-estimator comprises a Kalman filter that predicts states of the second environment model.

Example 12 includes the system of any of examples 9-11, wherein the algorithm selector generates an output indicating that a first environment model is the true model of the current operating environment when a first weighting factor generated from a first of the plurality of environment detection paths exceeds a first probability threshold and a second weighting factor generated by a second of the plurality of environment detection paths is less than a second probability threshold, where the first probability threshold is greater than the second probability threshold.

Example 13 includes the system of any of examples 9-12, further comprising a horizontal alignment calculator coupled to the inertial measurement unit, wherein the horizontal alignment calculator comprises a memory storing a plurality of leveling algorithms; wherein the horizontal alignment calculator selects and executed one of the plurality of leveling algorithms based on the output from the algorithm selector.

Example 14 includes the system of any of examples 9-13, wherein the environment model for each of the plurality of the environment detection paths is optimized to mimic environmental oscillations for one of an on-the-ground environment, an airborne environment, or an at-sea environment.

Example 15 includes the system of any of examples 9-14, wherein the environment model for each of the plurality of the environment detection paths is implemented using a Gauss-Markov model.

Example 16 includes the system of any of examples 9-15, wherein the weighting factor calculated by each of the plurality of environment detection paths is normalized for each prediction iteration performed by its propagator-estimator algorithm.

Example 17 includes a method for detecting an operating environment for a inertial sensing device having an inertial measurement unit that outputs a sequence of angular rate measurements, the method comprising: feeding the sequence of angular rate measurements into a plurality of environment detection paths implemented within the inertial sensing device, each of the plurality of environment detection paths generating angular oscillation predictions using an environment model optimized for a specific operating environment, wherein the environment model for each of the plurality of environment detection paths is optimized for a different operating environment; calculating a first sequence of angular oscillation predictions by inputting the sequence of angular rate measurements into a first propagator-estimator that implements a first environment model optimized for a first operating environment; calculating a second sequence of angular oscillation predictions by inputting the sequence of angular rate measurements into a second propagator-estimator that implements a second environment model optimized for a second operating environment; outputting from a first environment detection path a first weighting factor expressing a probability that the first environment model is a true model of a current operating environment calculated as a function of an output of the first propagator-estimator and the sequence of angular rate measurements; outputting from a second environment detection path a second weighting factor expressing a probability that the second environment model is the true model of the current operating environment calculated as a function of an output of the second propagator-estimator and the sequence of angular rate measurements; generating an output to a horizontal alignment calculator within the inertial sensing device, wherein the selection output is determined as a function of the first weighting factor and the second weighting factor, and wherein the output identifies a detected environment; and based on the detected environment, executing within the horizontal alignment calculator one of a plurality of leveling algorithms.

Example 18 includes the method of example 17, wherein generating the output to the horizontal alignment calculator comprises: generating an output indicating that the first environment model is the true model of the current operating environment when the first weighting factor generated exceeds a first probability threshold and the second weighting factor is less than a second probability threshold, where the first probability threshold is greater than the second probability threshold.

Example 19 includes the method of any of examples 17-18, wherein the environment model for each of the plurality of the environment detection paths is optimized to mimic environmental oscillations for one of an on-the-ground environment, an airborne environment, or an at-sea environment.

Example 20 includes the method of any of examples 17-19, wherein the environment model for each of the plurality of the environment detection paths is implemented using a Gauss-Markov model.

In various alternative embodiments, system elements, processes, or examples described throughout this disclosure may be implemented on one or more computer systems comprising a processor executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An inertial sensing device, the device comprising:
    an inertial measurement unit, wherein the inertial measurement unit measures current actual environment oscillations affecting the inertial sensing device and outputs a sequence of angular rate measurements based on the current actual environment oscillations; and
    an environment detection system coupled to the inertial measurement unit, the environment detection system comprising a processor and a non-transient data storage device, wherein the processor executes:
    an algorithm selector; and
    a plurality of environment detection paths each receiving the sequence of angular rate measurements from the inertial measurement unit, each of the environment detection paths simultaneously executing an environmental model, a propagator-estimator, and a weighting factor calculator;
    wherein a first environment detection path of the plurality of environment detection paths comprises a first environment model that mimics environmental oscillations associated with a first environment, a first propagator-estimator that calculates a first estimate of a true angular rate given that the first environment model is a true model of a current operating environment, and a first weighting factor calculator that calculates a first weighting factor expressing a probability that the first environment model is the true model of a current operating environment given the sequence of angular rate measurements;
    wherein a second environment detection path of the plurality of environment detection paths comprises a second environment model that mimics environmental oscillations associated with a second environment different from the first environment, a second propagator-estimator that calculates a second estimate of a true angular rate given that the second environment model is the true model of the current operating environment, and a second weighting factor calculator that calculates a second weighting factor expressing a probability that the second environment model is the true model of the current operating environment given the sequence of angular rate measurements;
    wherein the algorithm selector generates a detected environment output that indicates whether the inertial sensing device is operating within the first environment or the second environment as a function of whether the current actual environment oscillations are more closely predicted by the first environment model or the second environment model based on a function of the first weighting factor and the second weighting factor.

2. The device of claim 1, further comprising a horizontal alignment calculator coupled to the inertial measurement unit, wherein the horizontal alignment calculator comprises a memory storing a plurality of leveling algorithms;

wherein the horizontal alignment calculator selects and executes one of the plurality of leveling algorithms based on the output from the algorithm selector.

3. The device of claim 1, the plurality of environment detection paths further comprising a third environment detection path that mimics environmental oscillations associated with a third environment different from the first environment and the second environment, a third propagator-estimator that calculates a third estimate of the true angular rate given that the third environment model is the true model of the current operating environment, and a third weighting factor calculator that calculates a third weighting factor expressing a probability that the third environment model is the true model of the current operating environment given the sequence of angular rate measurements; and wherein the algorithm selector generates the output based on a function of the first weighting factor, the second weighting factor and the third weighting factor.

4. The device of claim 1, wherein the propagator-estimator for each of the plurality of environment detection paths is implemented using a Kalman filter.

5. The device of claim 1, wherein the algorithm selector generates an output indicating that the first environment model is the true model of the current operating environment when the first weighting factor exceeds a first probability threshold and the second weighting factor is less than a second probability threshold, where the first probability threshold is greater than the second probability threshold.

6. The device of claim 1, wherein the environment model for each of the plurality of the environment detection paths is optimized to mimic environmental oscillations for one of an on-the-ground environment, an airborne environment, or an at-sea environment.

7. The device of claim 1, wherein the environment model for each of the plurality of the environment detection paths is implemented using a Gauss-Markov model.

8. The device of claim 1, wherein the first weighting factors and the second weighting factor are normalized for each prediction iteration performed by the first propagator-estimator algorithm and the second propagator-estimator algorithm.

9. An environment detection system for a device having an inertial measurement unit that outputs a sequence of angular rate measurements, the system comprising:

a processor and a non-transient data storage device, wherein the processor executes:

an algorithm selector; and a plurality of environment detection paths each receiving the sequence of angular rate measurements, and each generating angular oscillation predictions using an environment model optimized for a specific operating environment, wherein the inertial measurement unit measures current actual environment oscillations affecting the device and outputs the sequence of angular rate measurements based on the current actual environment oscillations, wherein the environment model for each of the plurality of environment detection paths is optimized for a different operating environment;

wherein each of the plurality of environment detection paths outputs a weighting factor that is a function of a probability that its environment model is a true model of a current operating environment given the sequence of angular rate measurements; and wherein the algorithm selector generates a detected environment output that indicates whether the device is operating within a detected environment as a function of whether the current actual environment oscillations are more closely predicted by a first environment model of a first of the plurality of environment detection paths or a second environment model of a second of the plurality of environment detection paths based on a function of the weighting factor from each of the environment detection paths;

wherein the environment model for each of the plurality of the environment detection paths is optimized to mimic environmental oscillations for one of an on-the-ground environment, an airborne environment, or an at-sea environment.

10. The system of claim 9, the plurality of environment detection paths further comprising:

a first environment detection path of the plurality of environment detection paths including a first environment model that mimics environmental oscillations associated with a first environment, a first propagator-estimator that calculates a first estimate of a true angular rate given that the first environment model is a true model of a current operating environment, and a first weighting factor calculator that calculates a first weighting factor expressing a probability that the first environment model is the true model of a current operating environment given the sequence of angular rate measurements;

a second environment detection path of the plurality of environment detection paths including a second environment model that mimics environmental oscillations associated with a second environment different from the first environment, a second propagator-estimator that calculates a second estimate of a true angular rate given that the second environment model is the true model of the current operating environment, and a second weighting factor calculator that calculates a second weighting factor expressing a probability that the second environment model is the true model of the current operating environment given the sequence of angular rate measurements;

wherein the algorithm selector generates the output based on a function of the first weighting factor and the second weighting factor.

11. The system of claim 10, wherein the first propagator-estimator comprises a Kalman filter that predicts states of the first environment model; and wherein the second propagator-estimator comprises a Kalman filter that predicts states of the second environment model.

12. The system of claim 9, wherein the algorithm selector generates an output indicating that a first environment model is the true model of the current operating environment when a first weighting factor generated from a first of the plurality of environment detection paths exceeds a first probability threshold and a second weighting factor generated by a second of the plurality of environment detection paths is less than a second probability threshold, where the first probability threshold is greater than the second probability threshold.

13. The system of claim 9, further comprising a horizontal alignment calculator coupled to the inertial measurement unit, wherein the horizontal alignment calculator comprises a memory storing a plurality of leveling algorithms;

wherein the horizontal alignment calculator selects and executed one of the plurality of leveling algorithms based on the output from the algorithm selector.

14. The system of claim 9, wherein the environment model for each of the plurality of the environment detection paths is implemented using a Gauss-Markov model.

15. The system of claim 9, wherein the weighting factor calculated by each of the plurality of environment detection paths is normalized for each prediction iteration performed by its propagator-estimator algorithm.

16. A method for detecting an operating environment for a inertial sensing device having an inertial measurement unit that outputs a sequence of angular rate measurements, the method comprising:

receiving from the inertial measurement unit the sequence of angular rate measurements, wherein the inertial measurement unit measures current actual environment oscillations affecting the inertial sensing device and outputs the sequence of angular rate measurements based on the current actual environment oscillations;

feeding the sequence of angular rate measurements into a plurality of environment detection paths, the plurality of environment detection paths implemented within the inertial sensing device by executing code with a processor coupled to a non-transient data storage device, each of the plurality of environment detection paths generating angular oscillation predictions using an environment model optimized for a specific operating environment, wherein the environment model for each of the plurality of environment detection paths is optimized for a different operating environment;

calculating a first sequence of angular oscillation predictions by inputting the sequence of angular rate measurements into a first propagator-estimator that implements a first environment model optimized for a first operating environment;

calculating a second sequence of angular oscillation predictions by inputting the sequence of angular rate measurements into a second propagator-estimator that implements a second environment model optimized for a second operating environment;

outputting from a first environment detection path a first weighting factor expressing a probability that the first environment model is a true model of a current operating environment calculated as a function of an output of the first propagator-estimator and the sequence of angular rate measurements;

outputting from a second environment detection path a second weighting factor expressing a probability that the second environment model is the true model of the current operating environment calculated as a function of an output of the second propagator-estimator and the sequence of angular rate measurements;

generating a detected environment output to a horizontal alignment calculator within the inertial sensing device, wherein the detected environment output indicates whether the inertial sensing device is operating within the first operating environment or the second operating environment and is determined as a function of the first weighting factor and the second weighting factor, and wherein the output identifies a detected environment;

directing the horizontal alignment calculator to select and execute one of a plurality of leveling algorithms from a memory based on the detected environment output.

17. The method of claim 16, wherein generating the output to the horizontal alignment calculator comprises:

generating an output indicating that the first environment model is the true model of the current operating environment when the first weighting factor generated exceeds a first probability threshold and the second weighting factor is less than a second probability threshold, where the first probability threshold is greater than the second probability threshold.

18. The method of claim 16, wherein the environment model for each of the plurality of the environment detection paths is optimized to mimic environmental oscillations for one of an on-the-ground environment, an airborne environment, or an at-sea environment.

19. The method of claim 16, wherein the environment model for each of the plurality of the environment detection paths is implemented using a Gauss-Markov model.

* * * * *